United States Patent
Kuebler et al.

(10) Patent No.: US 10,805,116 B2
(45) Date of Patent: Oct. 13, 2020

(54) GATEWAY AND METHOD FOR CONNECTING A DATA SOURCE SYSTEM TO AN IT SYSTEM

(71) Applicant: Robert Bosch GmbH, Stuttgart (DE)

(72) Inventors: Simon Kuebler, Euerbach (DE); Steffen Muench, Karlstadt-Hesslar (DE); Holger Schnabel, Wuerzburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/325,760

(22) PCT Filed: Jul. 6, 2017

(86) PCT No.: PCT/EP2017/066911
§ 371 (c)(1),
(2) Date: Feb. 15, 2019

(87) PCT Pub. No.: WO2018/036708
PCT Pub. Date: Mar. 1, 2018

(65) Prior Publication Data
US 2019/0215192 A1    Jul. 11, 2019

(30) Foreign Application Priority Data
Aug. 23, 2016  (DE) .................. 10 2016 215 742

(51) Int. Cl.
*H04W 48/16*  (2009.01)
*H04L 12/66*  (2006.01)
(Continued)

(52) U.S. Cl.
CPC ............ *H04L 12/66* (2013.01); *H04L 63/029* (2013.01); *H04L 67/025* (2013.01); *H04L 67/12* (2013.01);
(Continued)

(58) Field of Classification Search
CPC .............................. H04L 12/66; H04L 63/026
See application file for complete search history.

(56) References Cited

U.S. PATENT DOCUMENTS

2006/0058658 A1 *  3/2006  King ....................... H04L 69/32
                                                            600/437
2011/0239263 A1 *  9/2011  Kim .................... H04N 21/6125
                                                            725/110
(Continued)

FOREIGN PATENT DOCUMENTS

CA       2336829 A1 *  1/2000  ......... H04L 47/6215
DE   102 14 540 A1   10/2003
(Continued)

OTHER PUBLICATIONS

International Search Report corresponding to PCT Application No. PCT/EP2017/066911, dated Sep. 11, 2017 (German and English language document) (8 pages).
(Continued)

*Primary Examiner* — Zhiren Qin
(74) *Attorney, Agent, or Firm* — Maginot, Moore & Beck LLP

(57) ABSTRACT

A gateway and method are disclosed for connecting a data source system to an IT system, having real-time capable middleware and non-real-time capable middleware on a common operating system. An application for communicating via a network protocol is executed on the non-real-time capable middleware which comprises a framework, at least one hardware interface via which the data source system is connected to the real-time capable middleware, at least one hardware interface via which the IT system is connected to the non-real-time capable middleware, and a software interface configured to allow communication between the real-time capable middleware and the non-real-time capable middleware. The gateway is configured to provide, via the
(Continued)

framework, predefined software interfaces for individual components of the data source system, which components can be connected to the real-time capable middleware, or for components of the IT system.

11 Claims, 3 Drawing Sheets

(51) Int. Cl.
*H04L 29/08* (2006.01)
*H04L 29/06* (2006.01)
(52) U.S. Cl.
CPC ............ *H04L 67/141* (2013.01); *H04L 67/28* (2013.01); *H04L 69/08* (2013.01)

(56) References Cited

U.S. PATENT DOCUMENTS

| | | | | |
|---|---|---|---|---|
| 2013/0094403 A1* | 4/2013 | Park | ........................ | H04W 4/38 370/255 |
| 2015/0355919 A1* | 12/2015 | Gatherer | ............... | G06F 9/4881 718/1 |
| 2017/0277173 A1* | 9/2017 | Bonomi | .................. | H04L 67/10 |
| 2018/0376338 A1* | 12/2018 | Ashrafi | ............... | H04L 41/0806 |

FOREIGN PATENT DOCUMENTS

| DE | 10 2011 005 062 A1 | 9/2012 |
|---|---|---|
| DE | 10 2012 003 370 A1 | 8/2013 |
| DE | 10 2012 205 301 A1 | 10/2013 |
| DE | 10 2013 218 566 A1 | 3/2015 |
| EP | 2 302 473 B1 | 3/2011 |
| EP | 2 395 429 A1 | 12/2011 |

OTHER PUBLICATIONS

Engels, Elmar, A versatile MATLAB toolbox for Rapid-Robot-Prototyping of custom made Industrial Robots, IEEE 2016 11th France-Japan & 9th Europe-Asia Congress on Machatronics (Mecatronics)/17th International Conference on Research and Education in Mechatronics (REM), Jun. 15, 2016, pp. 6-13, XP032946546.

* cited by examiner

GATEWAY AND METHOD FOR CONNECTING A DATA SOURCE SYSTEM TO AN IT SYSTEM

This application is a 35 U.S.C. § 371 National Stage Application of PCT/EP2017/066911, filed on Jul. 6, 2017, which claims the benefit of priority to Serial No. DE 10 2016 215 742.6, filed on Aug. 23, 2016 in Germany, the disclosures of which are incorporated herein by reference in their entirety.

The present disclosure is in the field of networked machines and relates to a gateway and a method for connecting a data source system to an IT system.

BACKGROUND

In the networking of machines, for example in the field of automation technology, the term "Industry 4.0" is now commonly used. Included in this is the networking of machines and/or systems and, in particular, their connection to the internet or the Internet of Things (so-called IoT). Document EP 2 302 473 B1, for example, discloses a connection of an industrial system to the internet.

The machines or systems themselves can be integrated into control systems, which can be used to enable an automated processing. A control system generally comprises a PLC, i.e. a programmable logic controller, which can control the corresponding processes.

Document DE 10 2013 218 566 A1, for example, discloses a communication module, which enables a connection to a fieldbus, such as is used in control systems, and provides a user interface for an operator.

DE 10 2011 005 062 A1, for example, discloses a so-called fieldbus access unit, which enables the connection of field devices arranged on a fieldbus to a server.

DE 10 2012 003 370 A1, for example, discloses an adapter for a fieldbus, here Profinet, which can be connected to an industrial PC via a microprocessor interface and provides data interfaces for both real-time data and for non-real-time data.

For more modern machines and systems, an appropriate connection and/or the necessary mechanisms, such as an Ethernet connection and a variable provision of the relevant machine data, are usually already provided. However, the life cycle of an entire production plant is usually between 10 and 40 years. This means that a great many of such plants or machines that are currently in operation are not network-capable.

It is therefore desirable to specify a method of providing a connection, in particular a retrospective connection, of a data source system such as a control system or a machine to an IT system, in particular the internet or an intranet.

SUMMARY

In accordance with the disclosure, a gateway and a method are proposed for connecting a data source system to an IT system having a number of networked processing units, which have the features of the disclosure. Advantageous configurations are the subject matter of the embodiments and the following description.

In the context of the disclosure, a gateway is used for connecting a data source system, for example a control system or a machine, to an IT system. To this end the gateway has a real-time capable middleware and a non-real-time capable middleware on a common operating system. An application is executed on the non-real-time capable middleware for communicating via a network protocol, such as TCP/IP, OPC UA or http(s), and the non-real-time capable middleware comprises a framework. Real-time capability means that individual processing steps are completed within defined time intervals. In real-time capable environments, it can be guaranteed that a processing result is available at a given time, so that in particular in industrial machines, the movements of different assemblies also run synchronously.

The type of operating system can be selected depending on the application, however, for example, Linux is the operating system currently proving most expedient in the field of industrial IT systems.

Furthermore, the gateway has at least one hardware interface, via which the data source system can be connected to the real-time capable middleware (also known as a services layer) of the gateway, and at least one hardware interface, via which the IT system can be connected to the non-real-time capable middleware. These interfaces can be typical interfaces used for the respective area. Potential devices for connecting the data source system include, for example, interfaces for sensors, such as analog and digital interfaces or special sensor interfaces, such as Serial Peripheral Interface (SPI), IO-Link or Bluetooth Low Energy (BLE), and for a fieldbus, for example, Ethernet (so-called Industrial Ethernet). Real-time capable Ethernet-based fieldbuses are listed, for example, in the IEC 61784-2 standard. Other possible systems are USB or wireless interfaces, such as Bluetooth or W-LAN. Possible systems for connecting the IT system, which can be, for example, a server connected to the Internet or a cloud, include Ethernet, USB or wireless interfaces such as Bluetooth or W-LAN. A software interface is additionally provided, which is configured to enable communication between the real-time capable middleware and the non-real-time capable middleware. This interface enables an exchange between the two middlewares that are available on the operating system and run in parallel with each other.

In addition, the gateway is or will be configured to provide software interfaces, which are predefined via the framework, for individual components of the data source system, which can be connected to the real-time capable middleware, or for components of the IT system.

The framework can be, in particular, a Software Core Framework. This allows different components of the data source system, for example sensors, to be connected very simply. For example, suitable drivers for the components can be provided. Similarly, various components of the IT system, such as servers or other services, can be provided or connected very simply and quickly. Via the non-real-time capable middleware therefore, services or data transport are provided for all components that can be connected to the gateway.

An aim of the disclosure is to make data source systems having at least one data source "internet-capable" in a particularly simple manner, wherein the data source is, for example, a processing unit (for example, programmable logic controller (PLC), numerical controller (NC) or CNC controller (Computerized Numerical Control) or a sensor, in particular ones that already exist. This is a scalable approach designed to upgrade legacy machines by using only a web-based configuration and without programming. The solution offers a modular extensibility to include further sensors, logics and providers and an automatic deployment of the associated web-based interfaces.

For the real-time capable middleware, it is also advantageous if an application for communicating via fieldbus is running and/or if the middleware comprises PLC functions, in particular the execution of the so-called scan cycle, comprising input scan, program scan and output scan. For this purpose, the real-time capable middleware can comprise a firmware module and a suitable platform, for example for motion control applications or machine tool applications (NC control).

In information technology, a platform, occasionally also referred to as a layer or level, refers to a uniform framework in which application programs can be developed and executed. It is located between two components of a computer system. For the component which uses the platform, the component below it is not visible. Therefore, the same component can be operated via a platform on various "substrates" (here firmware). Preferably, the platform provides functions for motion logic applications or for machine tool controllers.

This means that an optimum connection and communication with the data source system can be achieved. In addition, certain (or even all) functions for controlling the data source system can be incorporated directly in the gateway instead of in a separate PLC.

This means that the gateway can be used as a PLC for the data source system and there is no additional PLC required. It is advantageous in this case if the gateway is generated on a processing unit that already exists in the data source system, in particular a PLC.

While necessary hardware interfaces to the data source system normally already exist anyway, necessary hardware interfaces for the IT system can usually be provided very easily. All that is then necessary is to install the operating system with the above-mentioned middleware components and the hardware interface on the processing unit. An existing data source system can thus be very easily connected to the IT system retrospectively.

However, it is advantageous if an existing PLC of the data source system is connected to the data source system via the gateway as an additional component. This allows a simple retrospective connection without the need to modify an existing data source system. PLC functions in this case do not need to be present on the gateway, but they can be provided as an addition, in order to connect any other components for the data source system directly to the gateway.

In the case of completely new data source systems to be installed, the gateway can also be used as a PLC from the outset, so that a connection from the data source system to the IT system can be provided on installation.

For the non-real-time capable middleware it is advantageous if this is Java-based, i.e. if it comprises, for example, a Java-based virtual machine. This allows particularly simple handling and configuration procedures. Furthermore, the Java-based virtual machine offers a platform independence, which enables the non-real-time capable middleware to operate on different hardware platforms. Furthermore, the Java-based virtual machine offers the facility to run simple IoT mechanisms on a controller, since the majority of the IoT applications are implemented in Java.

In addition, it is also particularly advantageous if the gateway is or will be configured to provide a web-based configuration option for connecting the individual components, in particular by running a web server application. This means that programming is no longer necessary and the connection of new components can be carried out very quickly, simply and without programming knowledge. Appropriate configuration dialogs can then be displayed on a screen, for example when connecting a component with the corresponding attributes.

Advantageously, the gateway is or will be additionally configured to transfer, via the non-real-time capable middleware, data to a plurality of individual components of the IT system and/or to provide data for the plurality of individual components of the IT system. This allows a client or server functionality to be provided with the gateway. The IT system can therefore also comprise many different components, such as various servers and/or clouds, which can be operated simultaneously.

In the context of the disclosure it is therefore possible both to retrospectively connect existing data source systems which lack an IT system connection to an IT system very simply, and also to connect new data source systems to an IT system very simply and in a upgradable way. In particular, a modular retrofitting or integration of other components is very simple and quick.

Also, the provision in the form of a computer program is advantageous, since this incurs particularly low costs, in particular if, as mentioned above, a processing unit or PLC is already present. Suitable data carriers for providing the computer program are, in particular, magnetic, optical and electrical storage devices, such as hard disks, flash memory, EEPROMs, DVDs, etc., etc. A program download over computer networks (internet, intranet, etc.) is also possible.

Further advantages and embodiments of the disclosure are derived from the description and the enclosed drawing.

It goes without saying that the afore-mentioned features and those yet to be explained below can be applied not only in the corresponding specified combination, but also in other combinations or in isolation, without departing from the scope of the present disclosure.

The disclosure is illustrated schematically in the drawing by reference to exemplary embodiments and described in detail in the following with reference to the drawing.

DETAILED DESCRIPTION

Figure 1A:
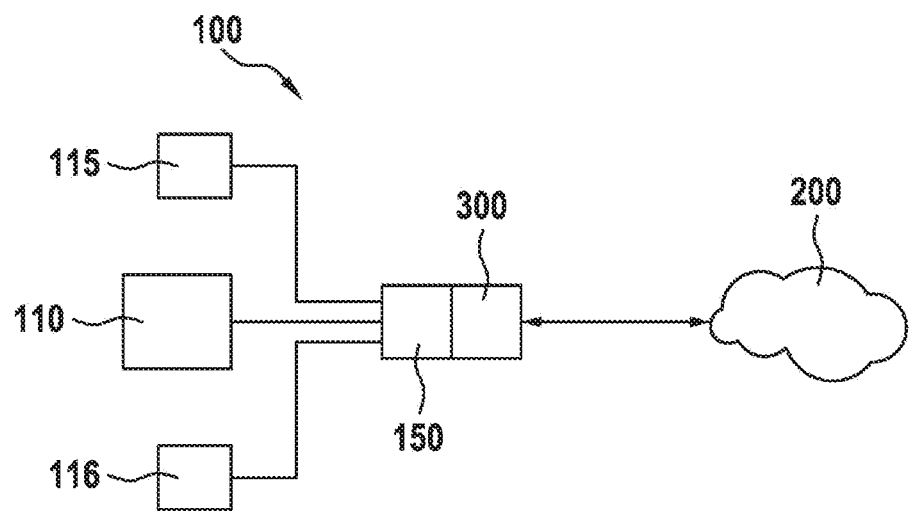
FIG. 1a shows a schematic arrangement involving the use of a gateway according to the disclosure in a preferred embodiment.

FIG. 1a shows a schematic arrangement involving the use of a gateway 300 according to the disclosure in a preferred embodiment. By means of the gateway 300 a data source system 100, for example, a control system or a machine, manual workstation or test station, is connected to an IT system 200 comprising a number of networked processing units, such as an intranet or the internet. In particular, the networking of the computational units is based on TCP/IP as the network protocol.

The control system 100 here comprises, by way of example, a machine 110 having three data sources, namely two sensors 115, 116 and a PLC 150 for controlling the data source system 100. The data source system 100 can be, for example, an automation system forming part of a production process, or a single machine. It goes without saying that further sensors and/or actuators may also be provided.

If an existing machine, system, etc. is to be made "internet-capable", so to speak, by means of the gateway, but does not yet have any data sources, then in particular sensors and, if appropriate, processing units can be deployed and connected to the gateway.

The IT system 200, which is coordinated with the control system 100, can involve, for example, one or more servers and/or cloud services. This can be where data and/or applications are stored. Corresponding data and/or applications can also be obtained from there.

The gateway 300 here then forms the PLC, by virtue of being, for example, appropriately generated on the existing PLC 150. For this purpose, either the hardware of the PLC can be used or else, for example, an industrial PC, where such a device is used for the control, on which a piece of software is installed as will be described below.

The gateway 300 can then collect data in the form of machine states of the machine 110 using the sensors 115, 116. Via a logic layer on the gateway 300, the data can then be processed. The data can then subsequently be forwarded to the IT system 200. In addition, the gateway 300 can also perform further PLC functions, so that the originally existing PLC is replaced by the gateway. The sensors can additionally be connected using conventional methods, such as digital and analog connection, but modern industry 4.0 solutions such as I/O-Link, Bluetooth Low Energy and USB are also conceivable. The sensors can also be connected via a fieldbus, which enables a real-time capability.

Via the gateway 300 formed on the PLC 150, data source systems without an original connection to an IT-system (so-called brownfield) can therefore be connected to an IT system without modifying the existing automation solution. Such existing systems can thus be retrofitted with the proposed solution.

Likewise, new data source systems to be installed (so-called greenfield), which are designed as shown in FIG. 1a, can be set up, in which case the gateway 300 is used as a PLC from the outset.

The configuration of the gateway in terms of the existing components in the data source system or the IT system can be carried out by web-based configuration without programming, thereby providing a so-called "Plug & Produce" and allowing initial startup times to be minimized.

Figure 1B:
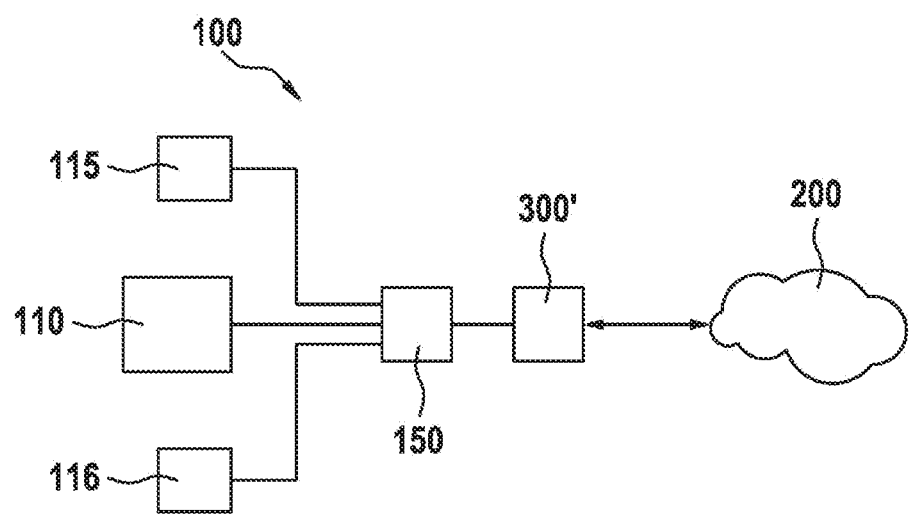
FIG. 1b shows a schematic arrangement involving the use of a gateway according to the disclosure in another preferred embodiment.

FIG. 1b shows a schematic arrangement involving the use of a gateway 300' according to the disclosure in a further preferred embodiment. As also shown in FIG. 1a, the control system 100 here is connected to the IT system 200.

Here however, the gateway is not implemented on the PLC, but as a stand-alone component, here as the gateway 300'. In this case, no PLC functionalities need to be provided on the gateway 300', for example, instead it may be sufficient to connect the PLC via a fieldbus.

Figure 2:
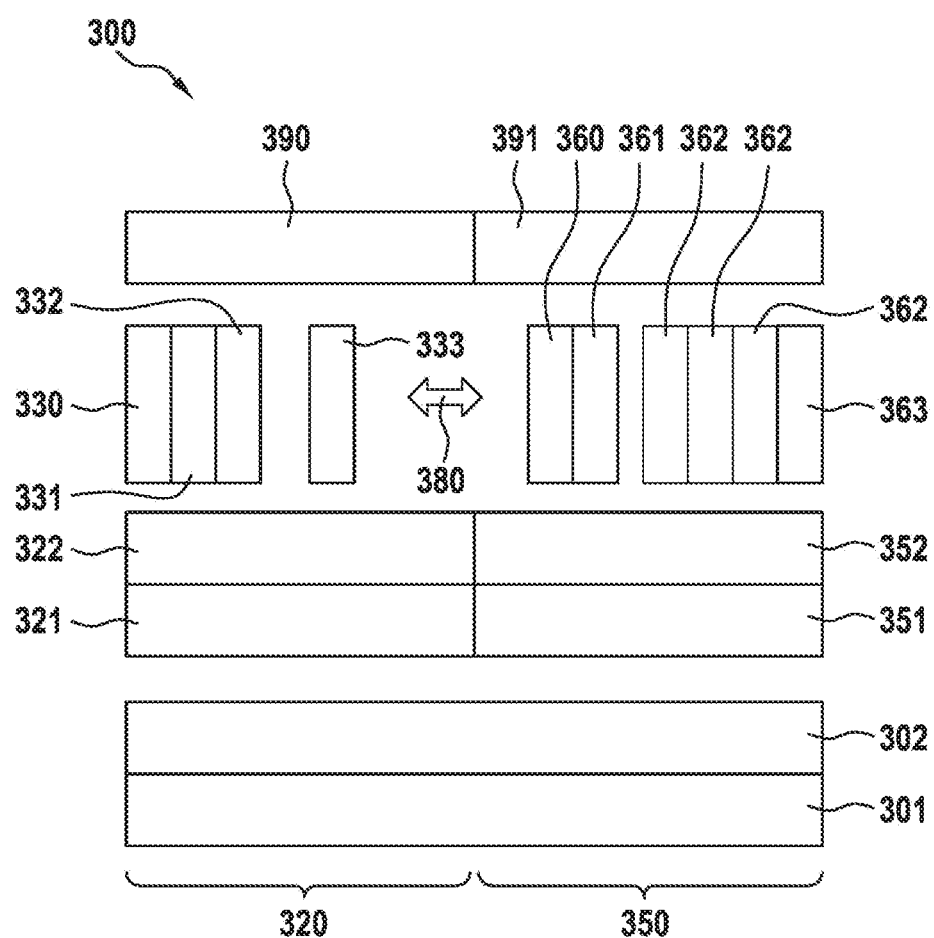
FIG. 2 shows a schematic diagram of an architecture of a gateway according to the disclosure in a preferred embodiment.

FIG. 2 shows a schematic diagram of an architecture of a gateway according to the disclosure in a preferred embodiment. The lowest level of the gateway 300 is formed by a hardware component 301. For example, this could be the hardware of a conventional industrial PC or else that of a PLC.

An operating system 320 runs on the hardware 301. For IoT-solutions such as used here, in particular, Linux is the preferred operating system. On the left-hand side, a real-time capable section 320 can now be seen, which runs on the operating system 302 and comprises the typical PLC world with firmware 321 and a platform 322 as real-time capable middleware. In this case then, typical PLC functions such as a control program 330, a machine communication protocol 331, for example OPC UA or similar, input and output functions (I/O) 332, as well as fieldbus functions 333 are provided as applications, so that appropriate components can be connected.

At the same time, a non-real-time capable section 350, shown here on the right, runs on the operating system 302, which comprises the typical IoT world with a Java-based virtual machine 351 and an OSGi framework 352 as non-real-time capable middleware. On this platform, typical IoT applications can then be installed. These can include, for example, cloud connections 363, data processing and further IoT services 362. In addition, a Bluetooth functionality 360 and a USB functionality 361 are shown as example applications.

Via a software interface 380, which is preferably a programming interface for high-level programming languages, all control functions can be retrieved and controlled from the non-real-time capable middleware 350 (Java environment). Thus, the real-time capable portion and/or the real-time capable middleware 320 and the non-real-time capable proportion and/or the non-real-time capable middleware 350 can communicate with one another or with each other. This means that deterministically in real-time, data can be acquired from sensors, transferred via the software interface 380 into the IoT world and forwarded from there to an IT system. Numerals 390 and 391 represent examples of two applications that can run on the gateway 300, in order to allow a user, for example, a simple and fast connection or configuration of new sensors or other services.

The software interface 380 can be, in particular, a so-called MLPI, a "Motion Logic Programming Interface". This is a programming interface for high-level languages such as C/C++, C #, VBA, Java or LabVIEW. This can be used to write applications with which, for example, controllers from Bosch Rexroth (IndraMotion XLC, MLC 13VRS) can be configured. In this case, an mlpi4java toolbox encapsulates the mlpi-core functionality as object-oriented Java classes, using a native Java-NDK library. The use of mlpi4Java allows MLPI functions to be called from the Java Runtime Environment. Applications that use the mlpi4Java toolbox only run on the Java Runtime Environment on Windows and Android, and therefore not on the target controller.

Figure 3:
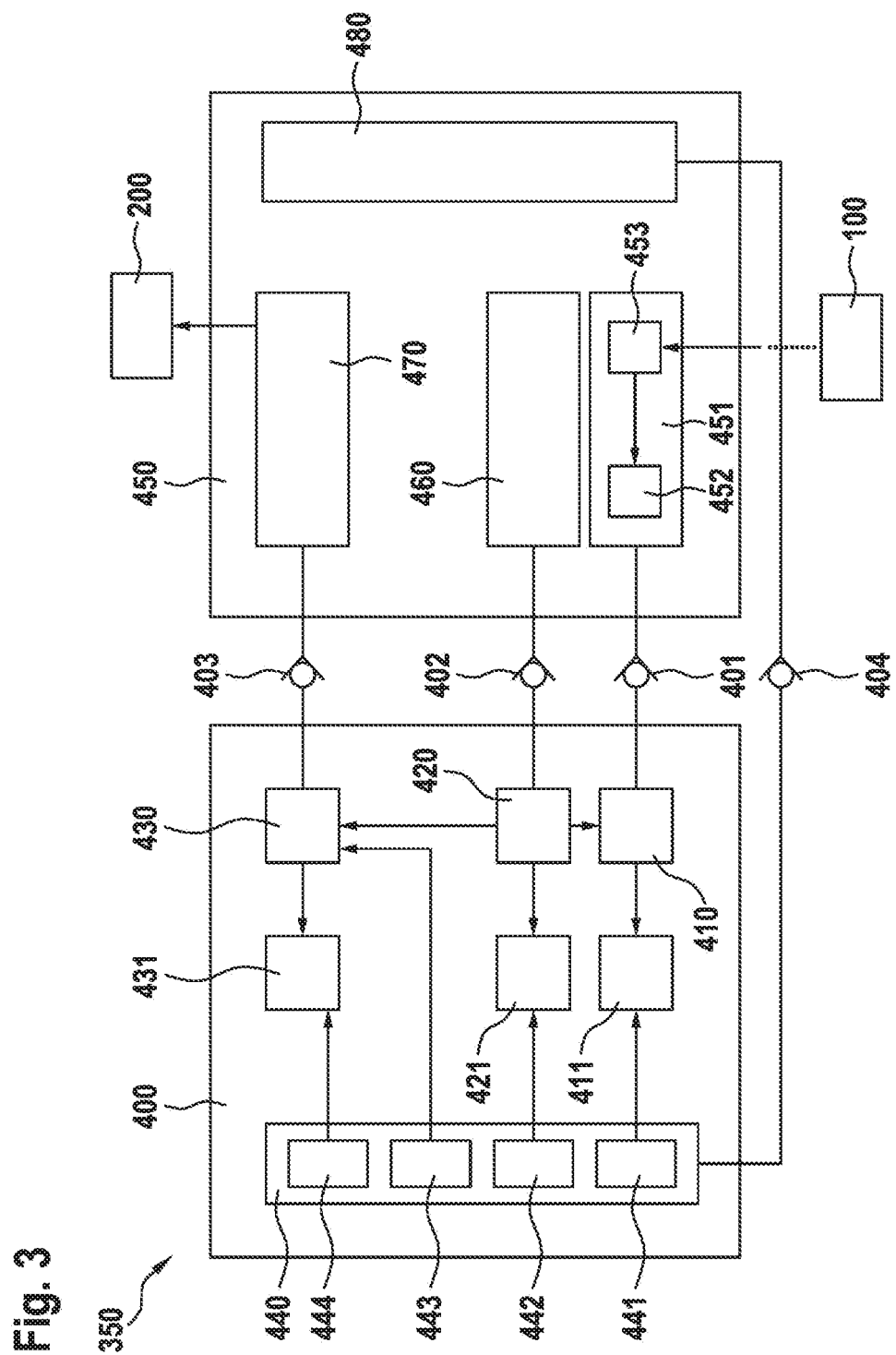
FIG. 3 shows a schematic diagram of a software structure of the internet-capable component of a gateway according to the disclosure in a preferred embodiment.

FIG. 3 schematically illustrates a software structure of the non-real-time capable component 350 of a gateway according to the disclosure in a preferred embodiment. The non-real-time capable component 350 comprises a core framework 400, which offers permanently defined software interfaces 401, 402, 403 and 404, via which user-defined functions can be added in a plug-in structure 450, here, for example, a sensor function 451 with a driver 453 and attributes 452, a logic 460, a data provider 470 and a web application 480. Via the sensor function 451, for example, data can be received from a sensor 115 via the above-mentioned software interface, processed with the logic 460 and transmitted to the IT system 200 via the data provider 470.

The core framework 400 accordingly provides services for sensors 410, services 420 for the logic and services 430 for data providers. This allows the entire data transport to be handled within the OSGi framework, i.e. the non-real-time capable portion from the sensor driver up to the deployment for the provider.

Furthermore, the corresponding web components 441, 442, 443 and 444, designated collectively as 440, can be included in the core framework 400. Using appropriate configuration steps 411, 421 and 431 the services can therefore be configured.

The core framework 400 provides, as mentioned, permanently defined software interfaces to which any providers, sensors and logics can be docked. If the docked elements provide the appropriate attributes, then the corresponding web-based interfaces which are required for the configuration of a sensor, for example, will also be directly displayed. A plurality of providers can also be operated in parallel, i.e. data can be sent to a plurality of components of the IT system in parallel (client functionality) and/or be provided for a plurality of components in parallel (server functionality).

The invention claimed is:

1. A gateway for connecting a data source system to an information technology system comprising:
    a plurality of networked processors configured to provide real-time capable middleware and non-real-time capable middleware on a common operating system, a first application for communicating via a network protocol being executed on the non-real-time capable middleware, the non-real-time capable middleware having a framework;
    at least one first hardware interface configured to connect the data source system to the real-time capable middleware;
    at least one second hardware interface configured to connect the information technology system to the non-real-time capable middleware; and
    a software interface configured to enable communication between the real-time capable middleware and the non-real-time capable middleware,
    wherein the gateway is configured to provide, via the framework, predefined software interfaces for individual components of the data source system, which are connected to the real-time capable middleware, or for components of the information technology system.

2. The gateway as claimed in claim 1, wherein at least one of:
    a second application for communicating via fieldbus is executed on the real-time capable middleware; and
    the real-time capable middleware has programmable logic controller functionalities.

3. The gateway as claimed in claim 1, wherein the non-real-time capable middleware is Java-based.

4. The gateway as claimed in claim 1, wherein the gateway is configured to provide a web-based configuration facility for connecting the individual components.

5. The gateway as claimed in claim 1, wherein the gateway is configured to at least one of (i) transfer, via the non-real-time capable middleware, data to a plurality of individual components of the information technology system and (ii) provide data for the plurality of individual components of the information technology system.

6. The method as claimed in claim 1, wherein the gateway is configured to act as a programmable logic controller for the data source system.

7. The method as claimed in claim 1, further comprising:
    connecting a programmable logic controller of the data source system to the information technology system using the gateway.

8. The method as claimed in claim 1, wherein one of (i) the gateway is implemented on a processor of the data source system and (ii) the processor of the data source system is replaced by the gateway.

9. The method as claimed in claim 8, wherein the processor of the data source system is a programmable logic controller.

10. A method for connecting a data source system to an information technology system using a gateway having (i) a plurality of networked processors configured to provide real-time capable middleware and non-real-time capable middleware on a common operating system, a first application for communicating via a network protocol being executed on the non-real-time capable middleware, the non-real-time capable middleware having a framework, (ii) at least one first hardware interface, (iii) at least one second hardware interface, and (iv) a software interface configured to enable communication between the real-time capable middleware and the non-real-time capable middleware, wherein the gateway is configured to provide, via the framework, predefined software interfaces for individual components of the data source system, which are connected to the real-time capable middleware, or for components of the information technology system, the method comprising:
    connecting the data source system to the real-time capable middleware of the Gateway using the at least one first hardware interface of the gateway; and
    connecting the information technology system is connected to the non-real-time capable middleware of the gateway using the at least one second hardware interface of the gateway.

11. A non-transitory machine-readable medium that stores a computer program configured to, when executed on a processor, provide a gateway for connecting a data source system to an information technology system, the gateway comprising:
    a plurality of networked processors configured to provide real-time capable middleware and non-real-time capable middleware on a common operating system, a first application for communicating via a network protocol being executed on the non-real-time capable middleware, the non-real-time capable middleware having a framework;
    at least one first hardware interface configured to connect the data source system to the real-time capable middleware;
    at least one second hardware interface configured to connect the information technology system to the non-real-time capable middleware; and
    a software interface configured to enable communication between the real-time capable middleware and the non-real-time capable middleware,
    wherein the gateway is configured to provide, via the framework, predefined software interfaces for individual components of the data source system, which are connected to the real-time capable middleware, or for components of the information technology system.

* * * * *